(12) United States Patent
Aoyama et al.

(10) Patent No.: US 10,755,863 B2
(45) Date of Patent: Aug. 25, 2020

(54) ELECTROLYTIC CAPACITOR

(71) Applicant: Panasonic Intellectual Property Management Co., Ltd., Osaka (JP)

(72) Inventors: Tatsuji Aoyama, Kyoto (JP); Yuichiro Tsubaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 3 days.

(21) Appl. No.: 16/128,442

(22) Filed: Sep. 11, 2018

(65) Prior Publication Data

US 2019/0013152 A1  Jan. 10, 2019

Related U.S. Application Data

(63) Continuation of application No. PCT/JP2017/006468, filed on Feb. 22, 2017.

(30) Foreign Application Priority Data

Mar. 24, 2016 (JP) .................. 2016-060636

(51) Int. Cl.
*H01G 9/028* (2006.01)
*H01G 9/035* (2006.01)
*H01G 9/00* (2006.01)
*H01G 9/055* (2006.01)

(52) U.S. Cl.
CPC .......... *H01G 9/028* (2013.01); *H01G 9/0032* (2013.01); *H01G 9/0036* (2013.01); *H01G 9/035* (2013.01); *H01G 9/055* (2013.01)

(58) Field of Classification Search
CPC .... H01G 9/028; H01G 9/0032; H01G 9/0036; H01G 9/035; H01G 9/055; H01G 9/151
See application file for complete search history.

(56) References Cited

U.S. PATENT DOCUMENTS

| | | | | |
|---|---|---|---|---|
| 6,134,099 A | * | 10/2000 | Igaki | .......... H01G 9/0036 361/509 |
| 6,349,028 B1 | * | 2/2002 | Komatsu | .......... H01G 9/02 361/504 |
| 2006/0062958 A1 | * | 3/2006 | Yoshida | .......... C08G 61/124 428/64.4 |

(Continued)

FOREIGN PATENT DOCUMENTS

| | | |
|---|---|---|
| JP | 2006-108650 | 4/2006 |
| JP | 2009-246289 | 10/2009 |
| JP | 2015-165550 | 9/2015 |

OTHER PUBLICATIONS

International Search Report of PCT application No. PCT/JP2017/006468 dated May 30, 2017.

*Primary Examiner* — Dion Ferguson
(74) *Attorney, Agent, or Firm* — McDermott Will & Emery LLP

(57) ABSTRACT

An electrolytic capacitor includes an anode body with a dielectric layer; a solid electrolyte layer; and an electrolytic solution. The solid electrolyte layer includes a π-conjugated conductive polymer and an organic sulfonic acid. The electrolytic solution includes a solvent and an acid component, and the acid component includes a sulfuric acid. A concentration of the sulfuric acid in the electrolytic solution ranges from 2.9 ppm to 532 ppm, inclusive.

22 Claims, 1 Drawing Sheet

(56) References Cited

U.S. PATENT DOCUMENTS

| | | | |
|---|---|---|---|
| 2008/0316679 A1* | 12/2008 | Sugihara | H01G 9/145 361/504 |
| 2010/0165546 A1* | 7/2010 | Yoshida | H01G 9/0036 361/525 |
| 2011/0239424 A1* | 10/2011 | Shibuya | H01G 9/0032 29/25.41 |
| 2012/0018662 A1* | 1/2012 | Sugihara | C08G 61/126 252/62.2 |
| 2012/0300368 A1* | 11/2012 | Matsuura | H01G 9/035 361/506 |
| 2014/0043731 A1* | 2/2014 | Yamada | C08G 73/0266 361/530 |
| 2014/0078645 A1* | 3/2014 | Sugihara | H01G 9/0036 361/523 |
| 2014/0268497 A1* | 9/2014 | Weaver | H01G 9/008 361/509 |
| 2016/0336117 A1 | 11/2016 | Koseki et al. | |
| 2017/0256362 A1* | 9/2017 | Tsubaki | H01G 9/028 |

* cited by examiner

ELECTROLYTIC CAPACITOR

RELATED APPLICATIONS

This application is a continuation of the PCT International Application No. PCT/JP2017/006468 filed on Feb. 22, 2017, which claims the benefit of foreign priority of Japanese patent application No. 2016-060636 filed on Mar. 24, 2016, the contents all of which are incorporated herein by reference.

TECHNICAL FIELD

The present disclosure relates to an electrolytic capacitor including a solid electrolyte layer and an electrolytic solution.

BACKGROUND

As capacitors having a small size, a large capacitance, and low ESR (Equivalent Series Resistance) capacitors, promising candidates are electrolytic capacitors including an anode body on which a dielectric layer is formed, a solid electrolyte layer formed so as to cover at least a part of the dielectric layer, and an electrolytic solution.

For the solid electrolyte layer, a π-conjugated conductive polymer with a dopant is used. It is known that the dopant gradually comes out into the electrolytic solution, which is called as a dedoping phenomenon. Thus, the conductive polymer degrades with time, thereby gradually increasing the ESR of the electrolytic capacitor.

Therefore, it is attempted that a dedoping phenomenon is suppressed by including an acid component in an electrolytic solution to decrease the pH value of the electrolytic solution (See Unexamined Japanese Patent Publication No. 2006-108650).

SUMMARY

An aspect of the present disclosure relates to an electrolytic capacitor including an anode body with a dielectric layer, a solid electrolyte layer, and an electrolytic solution. The solid electrolyte layer includes a π-conjugated conductive polymer and an organic sulfonic acid. The electrolytic solution includes a solvent and an acid component, the acid component includes a sulfuric acid. A concentration of the sulfuric acid in the electrolytic solution ranges from 2.9 ppm to 532 ppm, inclusive.

According to the present disclosure, there can be provided an electrolytic capacitor that is excellent in heat resistance, and capable of maintaining low ESR.

DESCRIPTION OF EMBODIMENT

Figure 1:
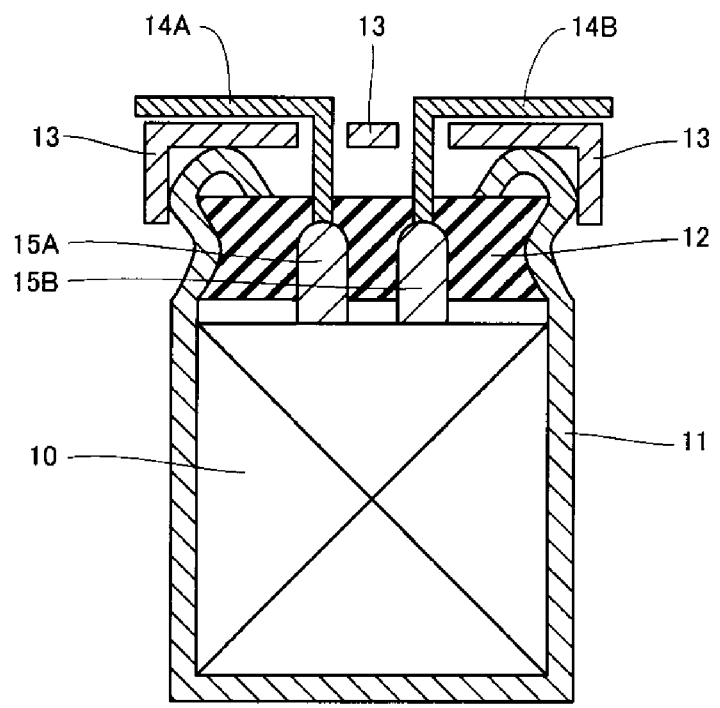
FIG. 1 is a schematic sectional view illustrating an electrolytic capacitor according to an exemplary embodiment of the present disclosure.

The acid component in the electrolytic solution inhibits the phenomenon of dedoping from a conductive polymer, and at the same time, has an action of corroding an electrode of an electrolytic capacitor. Therefore, for suppressing electrode corrosion, it is common technique to exclude an acid component that exhibits strong acidity, and include an acid component that exhibits weak acidity in an electrolytic solution. However, since the acid component that exhibits weak acidity is not stable for a long period of time, and in particular, at high temperatures, it is difficult to maintain the quality of the conductive polymer.

The electrolytic capacitor according to the present disclosure includes an anode body with a dielectric layer, a solid electrolyte layer, and an electrolytic solution. The solid electrolyte layer includes a π-conjugated conductive polymer (hereinafter, also referred to simply as a conductive polymer), and an organic sulfonic acid. The electrolytic solution includes a solvent and an acid component, and the acid component includes a sulfuric acid.

In this regard, the sulfuric acid is included at a concentration (proportion by mass) ranging from 2.9 ppm to 532 ppm, inclusive, in the electrolytic solution. Although the sulfuric acid exhibits strong acidity, in the case of limiting the concentration in the electrolytic solution within the range mentioned above, it does not make electrode corrosion evident, and hardly degrades the performance of the electrolytic capacitor. On the other hand, since the sulfuric acid has an enhanced action of improving the conductivity of the conductive polymer by being doped in the conductive polymer, and has stability, the sulfuric acid has advantage for keeping the ESR of the electrolytic capacitor low.

It is to be noted that the concentration of the sulfuric acid in the electrolytic solution is measured for the electrolytic solution included in the electrolytic capacitor that is ready for shipment as a product, rather than the electrolytic solution (initial electrolytic solution) before or immediately after impregnating the capacitor element. The electrolytic capacitor to which a predetermined voltage is applied is subjected to aging for a predetermined period of time, and then shipped as a product.

When a concentration of the sulfuric acid is lower than 2.9 ppm, the effect of keeping the ESR of the electrolytic capacitor low is hardly achieved. On the other hand, when the concentration of the sulfuric acid exceeds 532 ppm, electrode corrosion starts to be evident, thereby leading to an increased leakage current. In particular, in a severe test performed at a temperature equal to or higher than 150° C., when the concentration of the sulfuric acid exceeds 532 ppm, rate of increase in leakage current becomes significant. The concentration of the sulfuric acid in the electrolytic solution more preferably ranges from 8.4 ppm to 236 ppm, inclusive.

The organic sulfonic acid acts as a dopant that increases the conductivity of the conductive polymer. The organic sulfonic acid may be included as an anion in the solid electrolyte layer. As the organic sulfonic acid, aliphatic sulfonic acids, aromatic sulfonic acids, polymeric sulfonic acids, and the like can be used. Especially, the polymeric sulfonic acids are most preferred from the viewpoint of inhibiting a dedoping phenomenon.

Examples of the polymeric sulfonic acid include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid. These sulfonic acids may be used alone or in combination of two or more of these sulfonic acids. These sulfonic acids may be a homopolymer, or a copolymer of two or more monomers. Especially, polystyrenesulfonic acid (PSS) is preferred. The weight-average molecular weight of the polymer sulfonic acid is not particularly limited but preferably ranges, for example, from 1000 to 100000, inclusive, in terms of facilitating the formation of a homogeneous solid electrolyte layer.

Since upper limit of usable amount of the sulfuric acid is low, a third acid component other than the sulfuric acid may be included in the electrolytic solution. This third acid component enhances the effect of inhibiting the phenomenon of dedoping from the conductive polymer. The third acid component is preferably an acid component that exhibits weak acidity, other than the organic sulfonic acid the sulfuric acid. Examples of the third acid component include a carboxylic acid, a boric acid, and a phosphonic acid. Especially, carboxylic acid is preferred. The concentration of the carboxylic acid in the electrolytic solution preferably ranges from 5% by mass to 40% by mass, inclusive, more preferably from 10% by mass to 30% by mass, inclusive.

The carboxylic acid preferably contains an aromatic compound (aromatic polycarboxylic acid) having two or more carboxyl groups. The pair of carboxyl groups adjacent to each other in the aromatic polycarboxylic acid is stable, thereby making a sub-reaction less likely to proceed. Therefore, the aromatic polycarboxylic acid exhibits an effect of stabilizing the conductive polymer over a long period of time. Especially, at least one selected from the group consisting of o-phthalic acid and pyromellitic acid is preferred as the aromatic polycarboxylic acid.

The electrolytic solution may include a base component. The base component neutralizes at least a part of the acid component. Hence, the electrode corrosion caused by the acid component can be suppressed while increasing the concentration of the acid component. For effectively inhibiting the dedoping of the organic sulfonic acid from the solid electrolyte layer, the acid component is preferably more excessive than the base component in terms of equivalence ratio. For example, the equivalence ratio of the acid component to the base component preferably ranges from 1.0 to 30, inclusive. In addition, the concentration of the base component in the electrolytic solution preferably ranges from 0.1% by mass to 20% by mass, inclusive, more preferably ranges from 3% by mass to 10% by mass, inclusive.

The base component is preferably at least one selected from the group consisting of ammonia, a primary amine, a secondary amine, a tertiary amine, a quaternary ammonium compound, and an amidinium compound. Especially, the base component is preferably at least one selected from the group consisting of a primary amine, a secondary amine, and a tertiary amine. The use of the primary to tertiary amines enhances an effect of stabilizing ESR for a long period of time. As each of the amines, an aliphatic amine, an aromatic amine, a heterocyclic amine, and the like can be used. Especially, aliphatic amines with a molecular weight ranging from 72 to 102, inclusive, are preferred because of the high degree of dissociation.

Examples of the primary to tertiary amines include methylamine, dimethylamine, trimethylamine, ethylamine, diethylamine, triethylamine, monoethyldimethylamine, ethylenediamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These amines may be used alone or in combination of two or more of these amines. Especially, the tertiary amine is preferred, and in particular, triethylamine and monoethyldimethylamine are preferred. Diethyldimethylammonium salts and the like are preferred as the quaternary ammonium compound, and cyclic amidine salts such as a 1,2,3,4-tetramethylimidazolinium salt are preferred as the amidine compound.

The ratio of the carboxylic acid is preferably equal to or more than 200 parts by mass, still more preferably equal to or more than 400 parts by mass with respect to 100 parts by mass of the base component. Since it is difficult to dissociate excessive carboxylic acid, the ratio of the carboxylic acid is preferably less than or equal to 1000 parts by mass with respect to 100 parts by mass of the base component. It is to be noted that a part of the carboxylic acid may be derived from a salt of the carboxylic acid and the base component. More specifically, a salt of the carboxylic acid and the base component may be used as a part of the solute. The use of such a salt achieves an effect of improving a degree of dissociation of the carboxylic acid.

The pH of the electrolytic solution is preferably less than or equal to 4, more preferably less than or equal to 3.8, still more preferably less than or equal to 3.6. When the pH of the electrolytic solution is less than or equal to 4, deterioration of the conductive polymer is further suppressed. The pH is preferably equal to or more than 2.0.

The solvent can include a glycol compound, a sulfone compound, a lactone compound, a carbonate compound, a monohydric or tri-or-more-hydric alcohol, or the like. As the glycol compound, ethylene glycol (EG), diethylene glycol, triethylene glycol, propylene glycol, polyethylene glycol (PEG), and the like can be used. As the sulfone compound, sulfolane, dimethyl sulfoxide, diethyl sulfoxide, and the like can be used. As the lactone compound, γ-butyrolactone, γ-valerolactone, and the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like can be used. As the alcohol, for example, glycerin can be used. These alcohols and compounds may be used alone or in combination of a plurality of alcohols and compounds.

Especially, the solvent preferably contains at least one (hereinafter, main solvent) selected from the group consisting of γ-butyrolactone, sulfolane, and ethylene glycol. The proportion of the main solvent in the solvent is preferably equal to or more than 50% by mass, more preferably equal to or more than 60% by mass, even more preferably equal to or more than 70% by mass.

The solid electrolyte layer may be formed by a method of applying a solution containing a monomer and the dopant including the organic sulfonic acid to the dielectric layer and then developing in-situ chemical polymerization or electrolytic polymerization. However, the solid electrolyte layer is preferably formed by a method of applying the conductive polymer to the dielectric layer in terms of the fact that excellent withstand voltage characteristics can be expected. More specifically, the solid electrolyte layer is preferably formed by impregnating the dielectric layer with a polymer dispersion containing a liquid component, the conductive polymer dispersed in the liquid component, and the organic sulfonic acid (in particular, polymeric sulfonic acid), forming a film that covers at least a part of the dielectric layer, and then volatilizing the liquid component from the film.

The concentration of the conductive polymer in the polymer dispersion preferably ranges from 0.5% by mass to 10% by mass, inclusive. The average particle diameter D50 of the conductive polymer preferably ranges, for example, from 0.01 μm to 0.5 μm, inclusive. Here, the average particle diameter D50 is a median diameter in a volume particle size distribution which is obtained by a measuring apparatus of particle size distribution according to dynamic light scattering.

As the π-conjugated conductive polymer, polypyrrole, polythiophene, polyaniline and the like are preferable. In the present disclosure, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like also include derivatives of polypyrrole, polythiophene, polyaniline, and the like, respectively. For example, the polythiophene includes poly(3,4-ethylenedioxythiophene) (PEDOT) which is a derivative of the polythiophene. These conductive polymers may be used alone, or two or more of the conductive polymers may be used in combination, or a copolymer of two or more monomers may be adopted. The weight-average molecular weight of the conductive polymer is not particularly limited and ranges from 1000 to 100000, inclusive, for example.

Hereinafter, the present disclosure is more specifically described with reference to an exemplary embodiment. The exemplary embodiment below, however, is not to limit the present disclosure.

Figure 2:
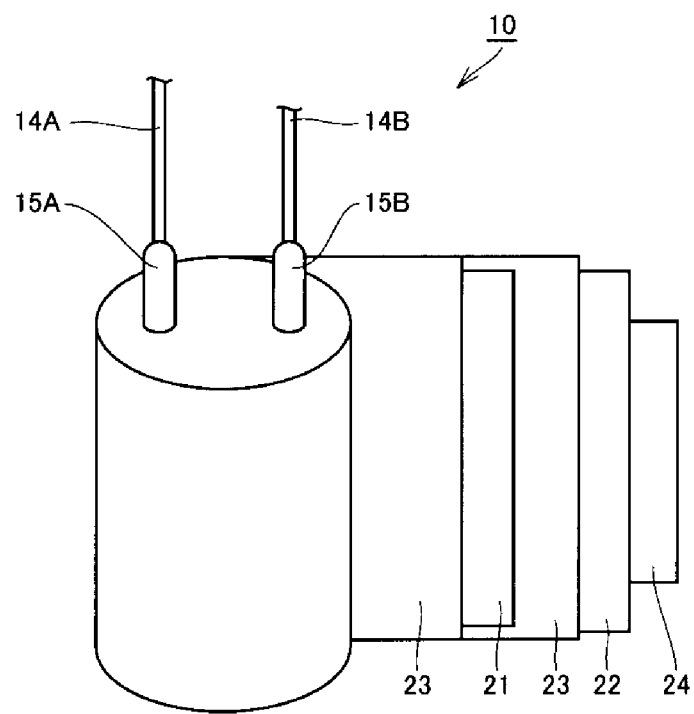
FIG. 2 is a schematic view for illustrating a configuration of a capacitor element according to the same exemplary embodiment.

FIG. 1 is a schematic sectional view illustrating an electrolytic capacitor according to the present exemplary embodiment, and FIG. 2 is a schematic view obtained by developing a part of a capacitor element for the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are led out from sealing member 12 and penetrate base plate 13, lead tabs 15A, 15B that connect the lead wires to electrodes of capacitor element 10, respectively, and an electrolytic solution (not shown). Bottomed case 11 is, at a part near an opening end, processed inward by drawing, and is, at the opening end, curled to swage sealing member 12.

Capacitor element 10 is formed of a wound body as illustrated in FIG. 2. The wound body includes anode body 21 connected to lead tab 15A, cathode body 22 connected to lead tab 15B, and separator 23. The wound body is a semi-finished product where no solid electrolyte layer is formed between anode body 21 and cathode body 22.

Anode body 21 and cathode body 22 are wound with separator 23 interposed between the anode body and the cathode body. An outermost periphery of the wound body is fixed with fastening tape 24. FIG. 2 shows partially developed wound body before the outermost periphery of the wound body is fixed. For separator 23, a nonwoven fabric can be used that contains, as a main constituent, for example, a cellulose, polyethylene terephthalate, vinylon, or aramid fiber, or the like.

Anode body 21 includes a metal foil whose surface is roughened so as to have projections and recesses, and the dielectric layer is formed on the metal foil having the projections and recesses. A conductive polymer is attached to at least a part of a surface of the dielectric layer to form a solid electrolyte layer. The solid electrolyte layer may cover at least a part of a surface of cathode body 22 and/or at least a part of a surface of separator 23. Capacitor element 10 in which the solid electrolyte layer has been formed is housed in bottomed case 11 together with the electrolytic solution.

<<Method for Producing Electrolytic Capacitor>>

Hereinafter, steps of one exemplary method for producing the electrolytic capacitor according to the present exemplary embodiment are described.

(i) Step of Preparing Anode Body 21 with Dielectric Layer

First, a metal foil as a raw material for anode body 21 is prepared. The type of the metal is not particularly limited, but it is preferred to use a valve metal such as aluminum, tantalum, or niobium, or an alloy including a valve metal, from the viewpoint of facilitating formation of a dielectric layer.

Next, the surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. The method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution, followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. The type of the metal is not particularly limited, but it is preferred to use a valve metal such as aluminum, tantalum, or niobium, or an alloy including a valve metal. The surface of cathode body 22 may be roughened as necessary. In addition, the surface of cathode body 22 may be subjected to an anodizing treatment, or a layer containing titanium or carbon may be formed on the surface.

(iii) Preparation of Wound Body

Next, anode body 21, cathode body 22, and separator 23 are used to prepare a wound body as shown in FIG. 2. Next, an end of the cathode body 22 located at the outermost layer is fixed with fastening tape 24. When anode body 21 is prepared by cutting a large metal foil, the wound body may further be subjected to an anodizing treatment in order to provide a dielectric layer on the cutting surface of anode body 21.

(iv) Step of Forming Capacitor Element 10

Next, a solid electrolyte layer including a conductive polymer is formed on the surface of the dielectric layer included in the wound body, thereby preparing capacitor element 10. A solid electrolyte layer may be formed by attaching to the dielectric layer a conductive polymer produced by in-situ chemical polymerization or electrolytic polymerization with the use of a polymerization liquid. The polymerization liquid is a solution containing a monomer or an oligomer, the organic sulfonic acid as a dopant, and the like. In the case of chemical polymerization, an oxidant is added to the polymerization liquid. Alternatively, a conductive polymer synthesized in advance may be deposited onto the dielectric layer, thereby forming a solid electrolyte layer.

Pyrrole, aniline, thiophene, a derivative of pyrrole, aniline, or thiophene, or the like is used for the monomer or the oligomer. The organic sulfonic acid is used as the dopant.

The organic sulfonic acid is not particularly limited but preferably the already mentioned polymeric sulfonic acid because the dedoping phenomenon is easily inhibited. As the organic sulfonic acid, methanesulfonic acid, t-butylsulfonic acid, pentanesulfonic acid, dodecylbenzenesulfonic acid, benzenesulfonic acid, p-toluenesulfonic acid, 4-ethylbenzenesulfonic acid, 4-butylbenzenesulfonic acid, 4-octylbenzenesulfonic acid, 2-naphthalenesulfonic acid, butylnaphthalenesulfonic acid, anthraquinone-2-sulfonic acid, di(2-ethylhexyl)sulfosuccinic acid, o-sulfobenzoic acid, perfluorobutanesulfonic acid, perfluoropentanesulfonic acid, and the like can be used.

As the conductive polymer synthesized in advance, it is preferable to use a polymer dispersion. The polymer dispersion contains a liquid component and a conductive polymer dispersed in the liquid component. The method for applying the polymer dispersion to a surface of the dielectric layer is preferably, for example, a method of impregnating the wound body with the polymer dispersion and drying the wound body with the polymer dispersion, because the method is simple. The polymer dispersion preferably includes, together with the conductive polymer, the organic sulfonic acid as a dopant. For example, a polymer dispersion (PEDOT/PSS) containing PEDOT as the conductive polymer and polystyrenesulfonic acid (PSS) as the organic sulfonic acid is preferred in terms of availability.

The step of applying the polymer dispersion to the surface of the dielectric layer and the step of drying the wound body may be repeated two or more times. These steps can be performed a plurality of times to increase coverage of the solid electrolyte layer on the dielectric layer.

(v) Step of Impregnating Capacitor Element 10 with Electrolytic Solution

Next, capacitor element 10 is impregnated with an electrolytic solution. The method for impregnating capacitor element 10 with an electrolytic solution is not particularly limited.

The concentration of the sulfuric acid in the electrolytic solution may be controlled by adding a minute amount of sulfuric acid to the electrolytic solution, or controlled in accordance with the condition of the conductive polymer or dopant included in the solid electrolyte layer. For example, in the case of forming the solid electrolyte layer by using the polymer dispersion, the concentration of the sulfuric acid in the electrolytic solution can be controlled in accordance with a concentration of the sulfuric acid remaining in the polymer dispersion. The sulfuric acid in the polymer dispersion is derived from iron sulfate, ammonium persulfate, and the like which are used as an oxidant in the process of producing the conductive polymer. The concentration of the sulfuric acid in the polymer dispersion can be controlled by the amount of the oxidant used in the production of the polymer dispersion, the filtration condition and ion exchange condition in separating and purifying the polymer dispersion, and the like. When the sulfuric acid is derived from the conductive polymer or the dopant, the amount of the sulfuric acid eluted from the solid electrolyte layer into the electrolytic solution may be controlled in accordance with the aging condition after completing the electrolytic capacitor. The concentration of the sulfuric acid in the electrolytic solution may be controlled by optionally combining the approaches mentioned above.

(vi) Step of Encapsulating Capacitor Element

Next, capacitor element 10 is housed in bottomed case 11. As a material for bottomed case 11, there can be used metals such as aluminum, stainless steel, copper, iron, and brass, or alloys of these metals. Thereafter, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Thereafter, an aging treatment is performed.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure will be described in more detail with reference to examples; however, the present disclosure is not to be considered to be limited to the examples.

Example 1

A wound electrolytic capacitor (t 10 mm×L (length) 10 mm) with a rated voltage of 80 V and a rated electrostatic capacity of 33 µF was prepared in the following manner.
(Preparation of Anode Body)

A 100-µm-thick aluminum foil was subjected to etching to roughen a surface of the aluminum foil. The roughened surface of the aluminum foil was subjected to an anodizing treatment to form a dielectric layer. The anodizing treatment was performed by immersing the aluminum foil in an ammonium adipate solution and applying a voltage of 150 V to the aluminum foil. Thereafter, the aluminum foil was cut into a size of 6 mm×120 mm to prepare an anode body.
(Preparation of Cathode Body)

A 50-µm-thick aluminum foil was subjected to etching to roughen a surface of the aluminum foil. Thereafter, the aluminum foil was cut into a size of 6 mm×120 mm to prepare a cathode body.
(Preparation of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. The wound body obtained was anodized again to form a dielectric layer at the cut end of the anode body. The end of the outer surface of the wound body was fixed with a fastening tape.
(Preparation of Polymer Dispersion)

A mixed solution was prepared by dissolving 3,4-ethylenedioxythiophene and a polymer sulfonic acid (organic sulfonic acid), i.e., polystyrenesulfonic acid (PSS, weight-average molecular weight 100000) in ion-exchanged water. While the mixed solution was stirred, iron (III) sulfate (oxidant) was added to the mixed solution to cause a polymerization reaction. Thereafter, the reaction solution was dialyzed to remove unreacted monomers and the oxidant, so that a polymer dispersion was obtained that contained about 5% by mass of polyethylene dioxythiophene doped with PSS (PEDOT/PSS). In this regard, by controlling the amount of the oxidant used and the purification condition for the reaction solution, dispersion A in which a concentration of the sulfuric acid is 0.5 ppm, dispersion B in which a concentration of the sulfuric acid is 8.5 ppm, and dispersion C in which a concentration of the sulfuric acid is 34.9 ppm were prepared.

(Formation of Solid Electrolyte Layer)

The wound body was immersed in the polymer dispersion (dispersion A) in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer.

(Impregnation with Electrolytic Solution)

As a solvent, an initial electrolytic solution was prepared. The initial electrolytic solution contains 50% by mass of γ-butyrolactone, 40% by mass of sulfolane, 10% by mass of triethylamine phthalate, which is a salt of the third acid component (carboxylic acid) and the base component. Furthermore, a minute amount of sulfuric acid was added to the initial electrolytic solution. The concentration of sulfuric acid in the initial electrolytic solution was adjusted to 2.4 ppm. The capacitor element was immersed in the initial electrolytic solution for 5 minutes in an atmosphere of a reduced pressure (40 kPa).

(Encapsulation of Capacitor Element)

The capacitor element that had been impregnated with the initial electrolytic solution was encapsulated to complete electrolytic capacitor (A1) as shown in FIG. 1. Thereafter, aging was performed at 105° C. for 60 minutes while applying a voltage of 100 V to the electrolytic capacitor.

(Concentration of Sulfuric Acid in Electrolytic Solution after Aging)

As mentioned above, the concentration of the sulfuric acid in the polymer dispersion and the concentration of the sulfuric acid in the initial electrolytic solution are adjusted, thereby controlling the concentration of the sulfuric acid in the electrolytic solution of the product (electrolytic capacitor) after the aging. When the concentration of the sulfuric acid in the electrolytic solution of the product after the aging was measured by ion chromatography, the concentration was 2.9 ppm.

Example 2

In the same manner as with electrolytic capacitor A1 according to Example 1 except for using dispersion B as a polymer dispersion and making the concentration of the sulfuric acid 0 ppm in the initial electrolytic solution in the formation of the solid electrolyte layer, electrolytic capacitor A2 was prepared, and subjected to aging. Thereafter, when the concentration of the sulfuric acid in the electrolytic solution was measured, the concentration was 8.4 ppm.

Example 3

In the same manner as with electrolytic capacitor A1 according to Example 1 except for using dispersion C as a polymer dispersion and making the concentration of the sulfuric acid 202 ppm in the initial electrolytic solution in the formation of the solid electrolyte layer, electrolytic capacitor A3 was prepared, and subjected to aging. Thereafter, when the concentration of the sulfuric acid in the electrolytic solution was measured, the concentration was 236 ppm.

Example 4

In the same manner as with electrolytic capacitor A1 according to Example 1 except for using dispersion C as a polymer dispersion and making the concentration of the sulfuric acid 502 ppm in the initial electrolytic solution in the formation of the solid electrolyte layer, electrolytic capacitor A4 was prepared, and subjected to aging. Thereafter, when the concentration of the sulfuric acid in the electrolytic solution was measured, the concentration was 532 ppm.

Comparative Example 1

In the same manner as with electrolytic capacitor A1 according to Example 1 except for making the concentration of the sulfuric acid approximately 0 ppm in the initial electrolytic solution in the formation of the solid electrolyte layer, electrolytic capacitor B1 was prepared, and subjected to aging. Thereafter, when the concentration of the sulfuric acid in the electrolytic solution was measured, the concentration was 0.5 ppm.

Comparative Example 2

In the same manner as with electrolytic capacitor A1 according to Example 1 except for using dispersion B as a polymer dispersion and making the concentration of the sulfuric acid 704 ppm in the initial electrolytic solution in the formation of the solid electrolyte layer, electrolytic capacitor B2 was prepared, and subjected to aging. Thereafter, when the concentration of the sulfuric acid in the electrolytic solution was measured, the concentration was 711 ppm.

<Evaluation>

The initial electrostatic capacity, ESR, and leakage current (LC) at 80 V were measured for 100 samples for each of electrolytic capacitors A1 to A4 and B1 to B2. In addition, after holding the electrolytic capacitors in an unloaded condition at 150° C. for 1000 hours, the same properties were measured, and the occurrence rate of short circuit was obtained. The occurrence rate of short circuit refers to a proportion of the number of samples that generate LC equal to or larger than 1 mA in a total number of the samples. The results are shown in Table 1. The initial electrostatic capacity, ESR, and LC each show an average value for the 100 electrolytic capacitors. The LC (29.5 μA) of electrolytic capacitor B2 after the holding has a value calculated excluding short-circuited capacitors.

TABLE 1

| Electrolytic capacitor | Electrostatic capacitance (μF) | | ESR (mΩ) | | LC (μA) | | Occurrence rate of short circuit (%) |
|---|---|---|---|---|---|---|---|
| | Initial stage | After holding | Initial stage | After holding | Initial stage | After holding | |
| A1 | 32.8 | 27.0 | 14.8 | 15.6 | 0.87 | 0.87 | 0 |
| A2 | 33.0 | 27.3 | 14.7 | 15.1 | 0.86 | 0.88 | 0 |
| A3 | 33.3 | 27.5 | 14.6 | 14.9 | 0.90 | 0.90 | 0 |
| A4 | 33.8 | 27.9 | 14.3 | 14.3 | 0.98 | 1.30 | 0 |
| B1 | 32.8 | 26.8 | 16.2 | 40.9 | 0.87 | 0.85 | 0 |
| B2 | 34.1 | 28.1 | 14.1 | 14.3 | 1.20 | 29.5 | 80 |

As shown in Table 1, electrolytic capacitors A1 to A4 according to Examples 1 to 4, with the electrolytic solutions containing minute amounts of sulfuric acid, have remarkably suppressed the increase in ESR, as compared with electrolytic capacitor B1 according to Comparative Example 1, substantially containing no sulfuric acid. On the other hand, from the results of electrolytic capacitor B2 according to Comparative Example 2, it is understood that when the concentration of the sulfuric acid exceeds the upper limit, the LC starts to increase, and thereafter, the rate of increase in LC is remarkably large.

The present disclosure can be applied to a so-called hybrid-type electrolytic capacitor that includes a solid electrolyte layer covering at least a part of a dielectric layer, and an electrolytic solution.

What is claimed is:

1. An electrolytic capacitor comprising:
   an anode body with a dielectric layer;
   a solid electrolyte layer; and
   an electrolytic solution, wherein:
   the solid electrolyte layer includes a π-conjugated conductive polymer and an organic sulfonic acid,
   the electrolytic solution includes a solvent and an acid component,
   the acid component includes a sulfuric acid, and
   a concentration of the sulfuric acid in the electrolytic solution ranges from 2.9 ppm to 532 ppm, inclusive.

2. The electrolytic capacitor according to claim 1, wherein the concentration of the sulfuric acid in the electrolytic solution ranges from 8.4 ppm to 236 ppm, inclusive.

3. The electrolytic capacitor according to claim 1, wherein the acid component includes a third acid component other than the organic sulfonic acid and the sulfuric acid.

4. The electrolytic capacitor according to claim 2, wherein the acid component includes a third acid component other than the organic sulfonic acid and the sulfuric acid.

5. The electrolytic capacitor according to claim 3, wherein the third acid component includes a carboxylic acid.

6. The electrolytic capacitor according to claim 4, wherein the third acid component includes a carboxylic acid.

7. The electrolytic capacitor according to claim 3, wherein the electrolytic solution includes a base component.

8. The electrolytic capacitor according to claim 5, wherein the electrolytic solution includes a base component, and includes the acid component more excessively than the base component in equivalence ratio.

9. The electrolytic capacitor according to claim 7, wherein the base component is at least one selected from the group consisting of ammonia, a primary amine, a secondary amine, a tertiary amine, a quaternary ammonium compound, and an amidinium compound.

10. The electrolytic capacitor according to claim 8, wherein the base component is at least one selected from the group consisting of ammonia, a primary amine, a secondary amine, a tertiary amine, a quaternary ammonium compound, and an amidinium compound.

11. The electrolytic capacitor according to of claim 1, wherein the solvent includes at least one selected from the group consisting of γ-butyrolactone, sulfolane, and ethylene glycol.

12. The electrolytic capacitor according to claim 1, wherein the π-conjugated conductive polymer is polythiophene or a derivative of the polythiophene.

13. The electrolytic capacitor according to claim 1, wherein the organic sulfonic acid includes a polystyrenesulfonic acid.

14. The electrolytic capacitor according to claim 1, wherein the solid electrolyte layer is a layer formed by a polymer dispersion containing the π-conjugated conductive polymer.

15. An electrolytic capacitor comprising:
   an anode body with a dielectric layer;
   a solid electrolyte layer; and
   an electrolytic solution, wherein:
   the solid electrolyte layer includes a π-conjugated conductive polymer and an organic sulfonic acid,
   the electrolytic solution includes a solvent, an acid component, and a base component, the electrolytic solution including the acid component more excessively than the base component in equivalence ratio,
   the acid component includes a sulfuric acid and a third acid component other than the organic sulfonic acid and the sulfuric acid, and
   a concentration of the sulfuric acid in the electrolytic solution ranges from 2.9 ppm to 532 ppm, inclusive.

16. The electrolytic capacitor according to claim 15, wherein the concentration of the sulfuric acid in the electrolytic solution ranges from 8.4 ppm to 236 ppm, inclusive.

17. The electrolytic capacitor according to claim 15, wherein the third acid component includes a carboxylic acid.

18. The electrolytic capacitor according to claim 15, wherein the base component is at least one selected from the group consisting of ammonia, a primary amine, a secondary amine, a tertiary amine, a quaternary ammonium compound, and an amidinium compound.

19. The electrolytic capacitor according to of claim 15, wherein the solvent includes at least one selected from the group consisting of γ-butyrolactone, sulfolane, and ethylene glycol.

20. The electrolytic capacitor according to claim 15, wherein the π-conjugated conductive polymer is polythiophene or a derivative of the polythiophene.

21. The electrolytic capacitor according to claim 15, wherein the organic sulfonic acid includes a polystyrenesulfonic acid.

22. The electrolytic capacitor according to claim 15, wherein the solid electrolyte layer is a layer formed by a polymer dispersion containing the π-conjugated conductive polymer.

* * * * *